3,141,860
FLAME-RESISTANT POLYOLEFINE
COMPOSITION
Hermann Sauer, Alfred Schmidt, and Kurt Kopetz, all of
Marl, Kreis Recklinghausen, Germany, assignors to
Chemische Werke Huls Aktiengesellschaft, Marl, Kreis
Recklinghausen, Germany, a corporation of Germany
No Drawing. Filed Dec. 20, 1960, Ser. No. 77,017
Claims priority, application Germany July 25, 1960
6 Claims. (Cl. 260—33.8)

It has been proposed to make flame-resistant compositions containing α-mono-olefinic homopolymers from 3 to 10% by weight of antimony trioxide and from 5 to 20 percent by weight of a 2,4,6-tribromoaniline compound in which the hydrogen atoms of the aromatic ring may be substituted by alkyl groups containing from 1 to 6 carbon atoms and/or the hydrogen atoms on the nitrogen may be substituted by acyl or alkyl groups containing from 1 to 6 carbon atoms.

It has now been found that flame-resistant compositions containing α-mono-olefinic homopolymers advantageously may be provided by substituting for the 2,4,6-tribromoaniline compounds of the above mentioned compositions a diaromatic compound of the following general formula

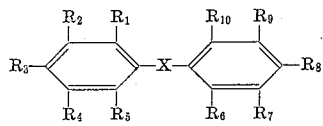

in which $R_1$ to $R_{10}$ stand for hydrogen, bromine, chlorine, straight or branched chain alkyl or alkenyl groups containing from 1 to 4 carbon atoms or the benzyl group which groups may be substituted by bromine and/or chlorine and X stands for a divalent saturated or unsaturated aliphatic group which may be substituted by bromine and/or chlorine or one or more aromatic groups, there being at least 3 bromine atoms in the molecule attached to one or more of the aromatic nuclei. Examples of groups represented by X are methylene, ethylidene, propylidene, dimethylmethylene, ethylene, trimethylene, vinylidene, vinylene and allylidene. The compounds represented by the above general formula should contain from 50 to 85% by weight of bromine and may contain, in addition, from 0 to 30% by weight of chlorine. The distribution of the halogen atoms on the aromatic ring is optional. Examples of diaromatic compounds which are ring substituted by halogen are the halogenated products of dibenzyl, dimethyldibenzyl, diethyldibenzyl, benzyltoluene, dibenzyltoluene, benzyl-methylbenzyl-benzene and diphenylpropane and mixtures thereof. These compounds need not have any stochiometric relationship. On the contrary it may be advantageous to use mixtures such as are produced directly by halogenating the above named starting materials or mixtures thereof without separating them by fractionation or otherwise. These mixtures are generally of an oily or resinous consistency and contain components with different numbers and distributions of the halogen atoms and tend generally less toward crystallization than the pure compounds. They may enhance the workability of the polymer mixtures.

By α-mono-olefinic homopolymers we mean thermoplastic polyethylene, polypropylene, polyisobutylene, polystyrene etc. These polymers may contain additions of fillers, coloring matter, lubricants, stabilizers etc.

The nucleus halogen substituted compounds are used in quantities within the range from 5 to 20%, and generally within the range from 6 to 12% and preferably within the range from 10 to 12% by weight based upon the polymer. The antimony trioxide content of the compositions is within the range from 3 to 10% and preferably from 4–8% by weight based upon the polymer.

The halogenated compounds and the antimony trioxide may be added to the polymer one at a time or together and worked in in known manner. The resulting mixtures are worked up into the desired shapes in the usual manner.

The flame-resistance can be determined by the method identified as DIN 4102 on plates having the dimensions 1000 x 190 x 4 mm. formed of the material to be tested. In this method the plates are supported vertically and at right angles to each other and suspended in a shaft furnace and bathed from below through a screen with a definite amount of preheated fresh air and subjected to the flame of a ring burner. In this test plates of flame-resistant mixtures will not continue to burn after removal of the burner flame. The testing of the mixtures of the present invention was carried out similarly to the specifications for DIN 4102 upon plates having the dimensions 300 x 70 x 4 mm. in a shaft furnace in which they were subjected to a direct colorless Bunsen flame, 15 cm. long, for 4 minutes. After removal of the Bunsen flame the time for the disappearance of the flame from the test pieces was measured. Test pieces on which the flame extinguished in a short time after removal of the Bunsen flame comply with the requirements of DIN 4102 and may be designated as being flame-resistant. The term DIN 4102 is an abbreviation which refers to the Deutsche Industrienorm (German industrial standard) No. 4102.

By the addition of the above-described nucleus brominated aromatic components in conjunction with antimony trioxide polymer compositions are produced which, in addition to being outstandingly flame-resistant also have good mechanical properties and are therefore available for use in building construction and all other fields in which flame-resistant material is required.

The invention is further described in and illustrated by the following specific examples. In the examples the parts stated are by weight.

*Example 1*

100 parts of polyethylene, 10 parts of a nucleus brominated dibenzyltoluene-benzyl-methylbenzyl-benzene mixture containing 64% by weight of bromine and 5 parts of antimony trioxide were mixed, compacted on rollers at 190° C. and then granulated. The granules were worked up into plates of 300 x 70 x 4 mm. dimensions which were subjected, in a shaft furnace to a colorless Bunsen flame of 15 cm. length for 4 minutes. The flame from the plates extinguished in a short time after the removal of the Bunsen flame.

*Example 2*

100 parts of polyethylene, 10 parts of nucleus brominated dibenzyltoluene-benzyl-methylbenzyl-benzene mixture containing 62% by weight of bromine and 9% by weight of chlorine and 5 parts of antimony trioxide were mixed and formed into plates as described in Example 1. In testing the flame-resistance all of the plates extinguished immediately after the removal of the flame source.

*Example 3*

100 parts of polyethylene, 10 parts of a nucleus brominated dibenzyltolene-benzyl-methylbenzyl-benzol mixture containing 53% by weight of bromine and 17% by weight of chlorine and 5 parts of antimony trioxide were mixed and worked up into plates as in Example 1. In the flame-resistance test all plates extinguished immediately after removal of the flame source.

*Example 4*

100 parts of polyethylene, 10 parts of nucleus brominated dimethyldibenzyl containing 72.2% by weight of bromine and 1.1% by weight of chlorine and 5 parts of antimony trioxide were mixed and worked up into plates as in Example 1. In the flame-resistance test all plates extinguished immediately upon removal of the flame source.

*Example 5*

100 parts of polyethylene, 10 parts of nucleus brominated diethyldibenzyl containing 66.9% by weight of bromine and 4.4% by weight of chlorine and 5 parts of antimony trioxide were mixed and worked up into plates as in Example 1. In the flame-resistance test all plates extinguished immediately upon removal of the flame source.

*Example 6*

100 parts of polyethylene, 10 parts of nucleus brominated 1,3-diphenylpropane containing 75% by weight of bromine and 5 parts of antimony trioxide were mixed and formed into plates as in Example 1. In the flame-resistance test all plates extinguished immediately upon removal of the flame source.

*Example 7*

100 parts of polyethylene, 10 parts of nucleus brominated benzyltoluene containing 76.5% by weight of bromine and 5 parts of antimony trioxide were mixed and formed into plates as in Example 1. In the flame-resistance test all plates extinguished immediately after removal of the flame source.

We claim:

1. Flame-resistant composition consisting essentially of an α-mono-olefinic homopolymer, antimony trioxide and a bromine-containing compound of the general formula

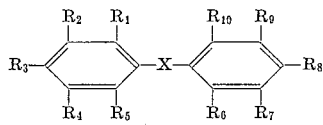

in which $R_1$ to $R_{10}$ each stands for a member of the group consisting of hydrogen, bromine, chlorine, chlorine and bromine substituted and unsubstituted alkyl groups containing from 1 to 2 carbon atoms and unsubstituted and chlorine, bromine and methyl substituted benzyl groups and X stands for a member of the group consisting of divalent unsubstituted and bromine and chlorine substituted aliphatic groups containing from 1 to 3 carbon atoms, said bromine-containing compound containing at least 3 bromine atoms per molecule each attached to an aromatic nucleus and containing from 50 to 85% by weight of bromine and from 0 to 30% by weight of chlorine, said composition containing from 3 to 10% by weight of said antimony trioxide and from 5 to 20% by weight of said bromine-containing compound based upon the polymer content of said composition.

2. Flame-resistant composition as defined in claim 1 in which said bromine-containing compound is a nucleus brominated mixture of dibenzyltoluene and benzyl-methylbenzyl-benzol containing from 53% to 64% by weight of bromine.

3. Flame-resistant composition as defined in claim 1 in which said bromine-containing compound is nucleus brominated dimethyl-dibenzyl containing about 72% by weight of bromine.

4. Flame-resistant composition as defined in claim 1 in which said bromine-containing compound is nucleus brominated diethyl-dibenzyl containing about 67% by weight of bromine.

5. Flame-resistant composition as defined in claim 1 in which said bromine-containing compound is the nucleus brominated 1,3-diphenylpropane containing about 75% by weight of bromine.

6. Flame-resistant composition as defined in claim 1 in which said bromine-containing compound is the nucleus brominated benzyltoluene containing about 76.5% by weight of bromine.

References Cited in the file of this patent

UNITED STATES PATENTS

| | | |
|---|---|---|
| 2,033,612 | Clark et al. | Mar. 10, 1936 |
| 2,244,284 | Britton et al. | June 3, 1941 |
| 2,517,930 | Ross et al. | Aug. 8, 1950 |
| 2,548,982 | Kemp | Apr. 17, 1951 |
| 2,556,880 | Lowey | June 12, 1951 |
| 2,588,362 | Danison | Mar. 11, 1952 |
| 2,623,910 | Robinson et al. | Dec. 30, 1952 |
| 2,669,521 | Bierly | Feb. 16, 1954 |
| 2,676,946 | McCurdy et al. | Apr. 27, 1954 |
| 2,723,963 | Price et al. | Nov. 15, 1955 |
| 2,846,478 | Smolin et al. | Aug. 5, 1958 |
| 3,017,440 | Entemann | Jan. 16, 1962 |
| 3,043,886 | Serres et al. | July 10, 1962 |
| 3,075,944 | Wick et al. | Jan. 29, 1963 |